United States Patent [19]

Ng et al.

[11] Patent Number: 5,161,897
[45] Date of Patent: Nov. 10, 1992

[54] LINEAR MOTION ROLLER BEARING ASSEMBLY

[75] Inventors: Alison Ng, New York; Peter R. Mugglestone, Northport, both of N.Y.

[73] Assignee: Thomson Industries, Inc., Port Washington, N.Y.

[21] Appl. No.: 718,196

[22] Filed: Jun. 20, 1991

[51] Int. Cl.$^5$ .............................. F16C 29/06
[52] U.S. Cl. ............................................ 384/44
[58] Field of Search ................................ 384/43–45

[56] References Cited

U.S. PATENT DOCUMENTS

| | | | |
|---|---|---|---|
| 3,086,824 | 4/1963 | Barkley | 384/43 |
| 3,547,502 | 12/1970 | Howard | 384/44 |
| 3,642,330 | 2/1972 | Newman | 384/44 |
| 3,704,919 | 12/1972 | Titt | 384/44 |
| 4,181,375 | 1/1980 | Ernst et al. | |
| 4,201,424 | 5/1980 | Ernst et al. | 384/43 |
| 4,293,166 | 10/1981 | Ernst et al. | 384/45 |
| 4,463,992 | 8/1984 | Heine | 384/44 |
| 4,508,395 | 4/1985 | Heine | 384/43 |
| 4,717,264 | 1/1988 | Walter et al. | 384/43 |
| 4,723,850 | 2/1988 | Albert | 384/43 |
| 4,790,671 | 12/1988 | Rogers | 384/43 |
| 4,815,862 | 3/1989 | Mugglestone et al. | 384/43 |
| 5,069,555 | 12/1991 | Mugglestone et al. | 384/43 |

FOREIGN PATENT DOCUMENTS

| | | | |
|---|---|---|---|
| 3207516 | 9/1983 | Fed. Rep. of Germany . | |
| 155919 | 12/1980 | Japan | 384/43 |
| 464721 | 8/1975 | U.S.S.R. | 384/44 |
| 989955 | 4/1965 | United Kingdom | 384/43 |

*Primary Examiner*—Thomas R. Hannon
*Attorney, Agent, or Firm*—Dilworth & Barrese

[57] ABSTRACT

A multiple track linear motion recirculating roller bearing assembly is provided for movement on a substantially cylindrical shaft. The bearing assembly includes a housing with a pair of end caps having a plurality of radially arranged roller turnarounds therein positioned at either end. The housing defines a plurality of radially disposed axial roller tracks, each having both load-bearing paths and return paths, which paths are in communication with the roller turnarounds formed in the end caps. Axial roller guides are provided which extend longitudinally within the housing between the end caps and are uniquely formed as a single integral axial guide element. This integral axial guide element serves to receive and retain load-bearing plates therein. Rollers are disposed in both the load-bearing and return paths of the roller tracks and are adapted to efficiently move the carriage along a substantially cylindrical shaft.

23 Claims, 5 Drawing Sheets

LINEAR MOTION ROLLER BEARING ASSEMBLY

BACKGROUND OF THE INVENTION

1. Field of the Invention

This invention relates to recirculating roller bearing assemblies, and more particularly to a linear motion recirculating roller bearing assembly of the type including a plurality of rollers which are contained in a track for rolling recirculating movement along parallel, spaced apart, load bearing and return paths.

2. Description of the Related Art

Linear motion recirculating roller bearing assemblies having multiple tracks for longitudinal movement along a shaft are known in the art. See, for example, U.S. Pat. Nos. 4,181,375, 4,293,166 and 4,463,992. These bearing assemblies are typically characterized by a housing which forms a plurality of tracks arranged in radial planes with respect to the longitudinal axis of the shaft. Each of the tracks has a load-bearing path wherein the roller elements contact the shaft and a spaced return path for serially recirculating the roller elements back to the load-bearing path. Turnarounds are positioned at each axial end of the tracks to interconnect the load-bearing and return paths. These bearing assemblies, particularly the assembly shown in the '922 patent, are difficult to manufacture because the load bearing surfaces must be ground in a longitudinal arcuate configuration to accommodate the rollers. This feature also makes it difficult for the bearing assembly to take load over the whole roller.

A plurality of individual axial guides are commonly provided in conjunction with the load bearing paths to guide and separate the rolling elements in the load bearing paths. These axial guides are usually in the form of separate axially extending elements which are individually placed between the end caps at the axial ends of the bearing assembly. Similarly, a plurality of individual inner guides may be positioned at each of the inner axes of the turnarounds to guide the roller elements from the load-bearing tracks to the return tracks. Both the axial guides and the inner guides usually must be individually and separately positioned within the bearing assembly. This technique is both time consuming and inefficient.

In addition to the problems associated with assembling and positioning the axial and inner guides, bearing assemblies making use of typical individual bearing plates tend to have alignment and positioning problems associated therewith. These bearing plates are usually positioned longitudinally over the load bearing tracks and serve to transmit loads from the carriage, through the roller elements, to the shaft. If these bearing plates are not properly and securely positioned, the bearing assembly will not operate efficiently and may cause binding and/or misalignment of the roller elements.

Load-bearing plates with a portion of the return paths integrally formed therein have been designed for use in chain-type bearings. See, for example, U.S. Pat. No. 4,790,671. These bearings, however, are not designed for use on round or near round shafts nor are they intended to be used as a subassembly in side-by-side radial arrangement for roller bearings used with round or near round shafts.

Therefore, it is highly desirable to have a high load capacity bearing assembly made up of a plurality of bearing plates interfitting in an annular configuration for linear motion along a round or near round shaft. Similarly, it is highly desirable to have a high load capacity bearing assembly which provides an integral axial and inner guide assembly for efficient and consistent positioning within the assembly while properly and securely aligning the bearing plates.

Accordingly, it is an object of the present invention to provide a linear motion roller bearing assembly for operation on a substantially cylindrical shaft which bearing has a high load capacity.

It is another object of the present invention to provide a linear motion roller bearing assembly incorporating annularly arranged bearing plates for linear motion along a round or near round shaft.

It is another object of the present invention to provide a linear motion roller bearing assembly incorporating integral axial and inner guides for ease of alignment and fabrication.

It is another object of the present invention to provide a linear motion roller bearing assembly having integral axial and inner guides which align and secure bearing plates within the assembly.

These and other highly desirable and unusual results are accomplished by the present invention in a linear motion roller bearing assembly comprising a plurality of annularly arranged bearing plates having at least a portion of load bearing and return paths formed therein. The bearing assembly may further comprise axial and inner guides integrally formed and adapted to secure and align a plurality of bearing plates therein for use on a substantially cylindrical shaft.

Objects and advantages of the invention are set forth in part herein and in part will be obvious therefrom or may be learned by practice with the invention, which is realized and attained by means of instrumentalities and combinations pointed out in the appended claims. The invention comprises the novel parts, constructions, arrangements, combinations, steps and improvements herein shown and described.

SUMMARY OF THE INVENTION

The present invention provides a multiple track linear motion recirculating roller bearing assembly for movement along a substantially cylindrical shaft. The bearing assembly includes a plurality of annularly arranged bearing plates radially disposed around the shaft. The bearing plates each having a portion of load bearing and return paths formed therein. A pair of end caps having a plurality of radially arranged integral roller turnarounds are disposed at either longitudinal end of the bearing assembly. The bearing defines a plurality of radially disposed axial roller tracks, each having both load-bearing paths and return paths, which paths are in communication with the roller turnarounds formed in the end caps. A plurality of axial roller guides extend longitudinally within the housing between the end caps and may be uniquely formed as a single integral axial guide element. Where desired, inner guides for assisting and guiding the rollers around the roller turnarounds also may be integrally formed as part of the integral axial guide element.

A plurality of load bearing plates are axially aligned in the bearing assembly and are the primary load carrying members. These plates may either fit within and be retained by retaining means formed in an outward radial portion of the axial roller guides. Alternatively, the bearing plates may abut together in an annular arrangement around the shaft to form the bearing assembly. Rollers are disposed in both the load bearing and return paths of the roller tracks and are adapted to efficiently move the carriage along a substantially cylindrical shaft. A wide variety of roller shapes including cylindrical, convex and concave varieties, may be used.

Fabrication of this unique linear motion roller bearing assembly is easily and efficiently accomplished. In one embodiment, an end cap is affixed to the housing. The integral axial guide element is loaded with load bearing plates and inserted, as a unit, into the housing. Thereafter, the second end cap is put into place and the bearing assembly is placed onto the shaft. The rollers are then loaded into the load-bearing and return paths of the roller tracks.

Alternatively, a plurality of load bearing plates are placed in abutting annular relation to form the bearing assembly. Axial guides are put into place and end caps are affixed at both longitudinal ends. The bearing assembly is loaded with rollers and inserted onto an appropriate shaft. The bearing assembly may, advantageously be formed within a carriage block or may be formed as a separate insert.

BRIEF DESCRIPTION OF THE DRAWINGS

The accompanying drawings, referred to herein and constituting a part hereof, illustrate the preferred embodiment of the linear motion roller bearing assembly of the present invention and, together with the description, serve to explain the principles of the invention.

DETAILED DESCRIPTION OF THE PREFERRED EMBODIMENT

Figure 1:
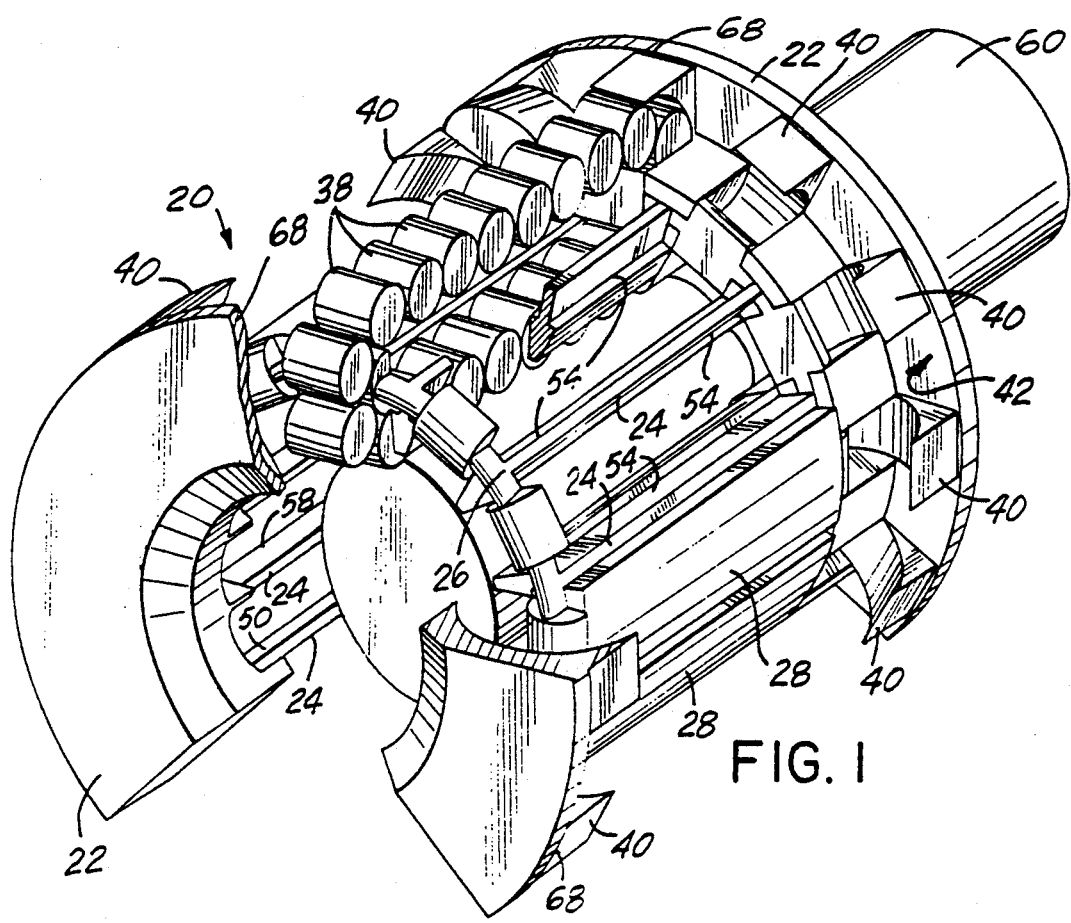
FIG. 1 is a perspective view in partial cross-section of the preferred embodiment of the present invention.
Figure 2:
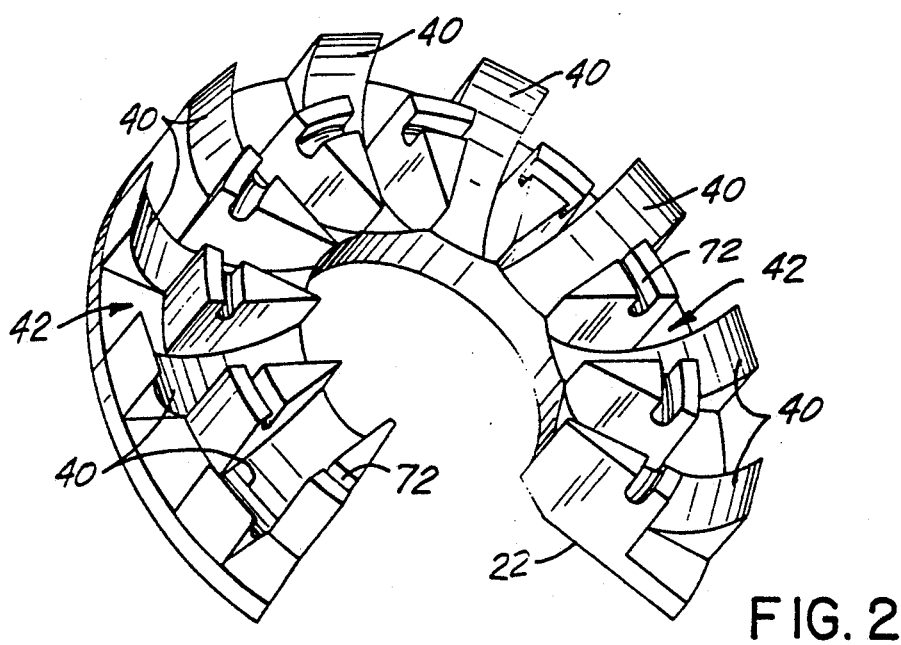
FIG. 2 is a perspective view of the end cap in accordance with the present invention.
Figure 4:
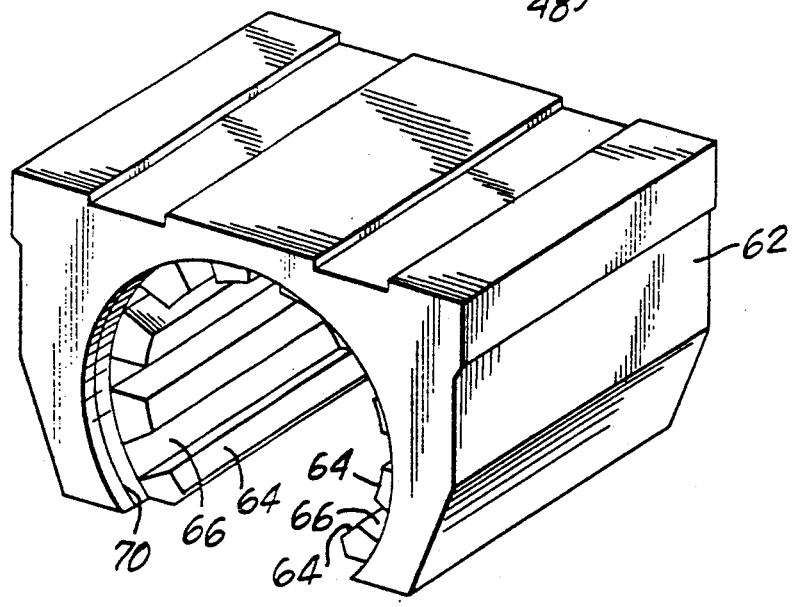
FIG. 4 is a perspective view of a carriage block for use with the present invention.
Figure 5:
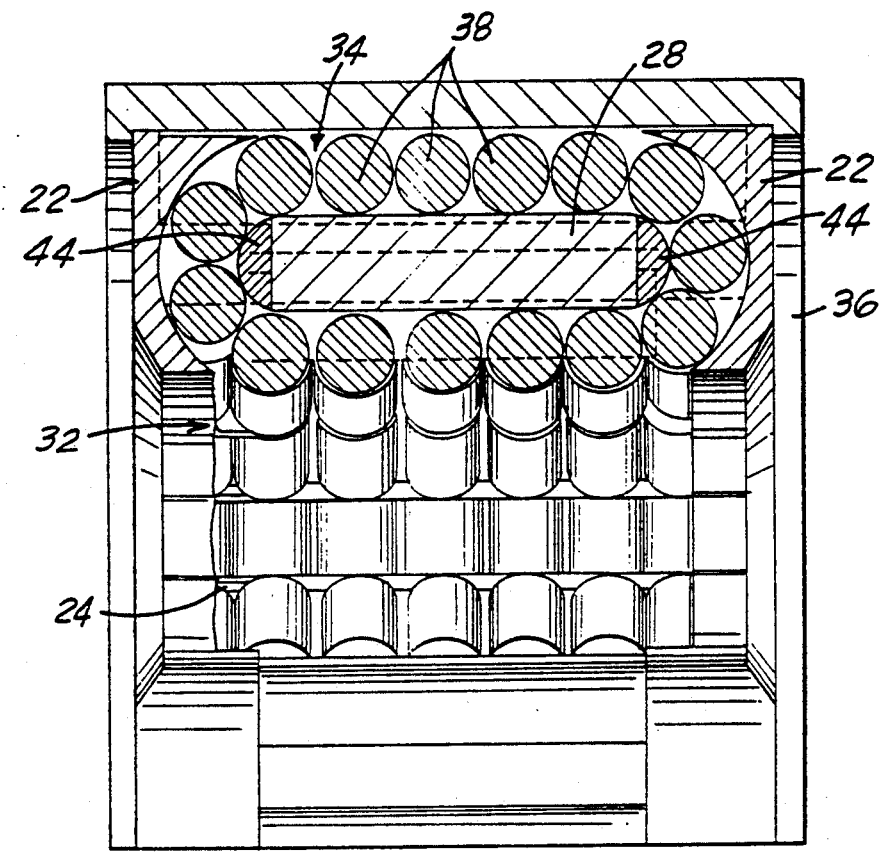
FIG. 5 is a side view in cross section of the linear motion roller bearing assembly in accordance with the present invention.

Referring to FIGS. 1 and 5, there is shown a linear motion open-type roller bearing in accordance with a preferred embodiment of the present invention. The bearing assembly, shown generally at 20, includes a pair of opposing end caps 22, a plurality of axial roller guides 24 formed as a unique integral axial roller guide element 26, and a plurality of load bearing plates 28. Together with a housing 36, this structure forms a plurality of roller tracks made up of load bearing paths 32 and return paths 34. These tracks are filled with rollers 38 adapted to transport the bearing assembly 20 along cylindrical shaft 60. As shown in FIGS. 1-5, rollers 38 are presented in cylindrical form. One skilled in the art will readily appreciate, however, that other types of rollers such as concave, convex, etc. could be used. Similarly, although a cylindrical shaft is shown in FIG. 1, one skilled in the art will appreciate that other shapes including "near round" type shafts are readily usable.

End caps 22 of bearing assembly 20 each have a plurality of cylindrical turnarounds 40 formed in the internal faces 42 thereof. These turnarounds 40 are radially oriented (FIG. 2) and serve to interconnect respective load bearing paths 32 and return paths 34 of the roller tracks. In order to facilitate a smooth and efficient passage of rollers 38 through turnarounds 40, inner guides 44 are provided at the inner axis of the turnaround. These inner guides 44 may be individually formed or, in particularly advantageous embodiments, may be integrally formed on opposing ends of the integral axial roller guide element 26 (FIGS. 1 and 3).

A unique feature of the present invention is the integral formation of the axial roller guides 24 into a single element for ease of fabrication, alignment, assembly and operation. Referring to FIG. 3, the integral axial roller guide element 26 is made up of individual axial roller guides 24 oriented in parallel side-by-side alignment and interconnected at each longitudinal end by perpendicular rib structure 46. Where inner guides 44 are incorporated, they are formed in the rib structure 46 between adjacent axial roller guides 24.

Figure 3:
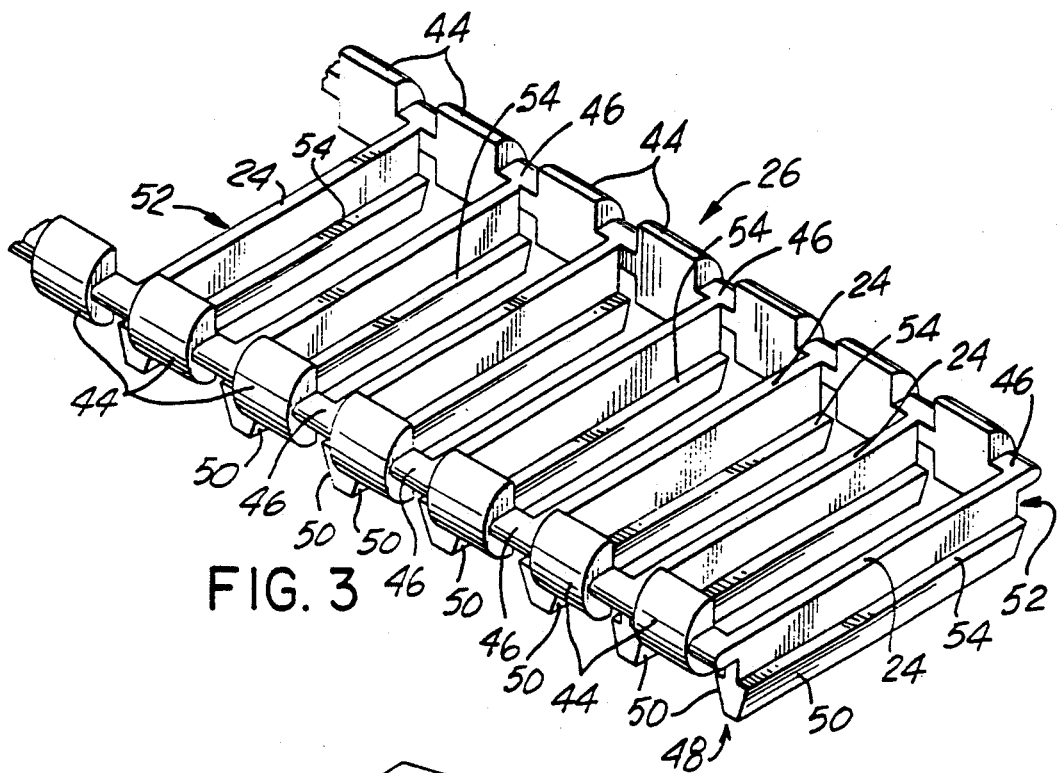
FIG. 3 is a perspective view of the integral axial guide element in accordance with the present invention.

Referring to FIG. 3, each axial roller guide 24 is provided with a lower portion 48 having vertically converging side walls 50 and an upper portion 52 having shelf structure 54. In this configuration, the shelf structure 54 of adjacent axial roller guides 24 define receiving means for receiving the load bearing plates 28 therein as shown in FIG. 1.

The integral axial roller guide element 26 is preferably fabricated from a deformable material such as, for example, a flexible polymer such as polypropylene, polyethylene, polyesters, etc., so that it can be efficiently formed in a flat configuration (FIG. 3) and later deformed to fit within housing 36. Alternatively, the integral axial roller guide element 26 may be formed of a semi-rigid material in its final arcuate configuration and snap fit into place within housing 36.

Housing 36 may advantageously be formed as part of the carriage block 62. As shown in FIG. 4 a plurality of lands 64 and grooves 66 may be longitudinally provided in the carriage block which grooves form a portion of the return paths 34 of the roller tracks 30. The lands 64 serve to support adjacent longitudinal sides of the load bearing plates 28. This configuration allows the bearing assembly to be fabricated directly in the carriage block 62.

Referring to FIGS. 6-9, load bearing plates 28 are the primary load carrying members and may be formed in a circumferential rectangular configuration (FIGS. 6, 8, 9) or, where desired, may be crowned (FIG. 7) to provide a self aligning feature. An inner radial surface 56 of the load bearing plates 28 forms a portion of the load bearing path 32. This inner radial surface 56 may conform to a portion of the cross-sectional area of the roller 38. For example, where a concave roller is to be used, a load bearing plate having a convex inner radial surface 56 may be used. Similarly, with a convex or barrel roller, either a concave or flat inner radial surface 56 may be used. Where a cylindrical roller is to be used, a flat or convex inner radial surface is desirable.

Figure 6:
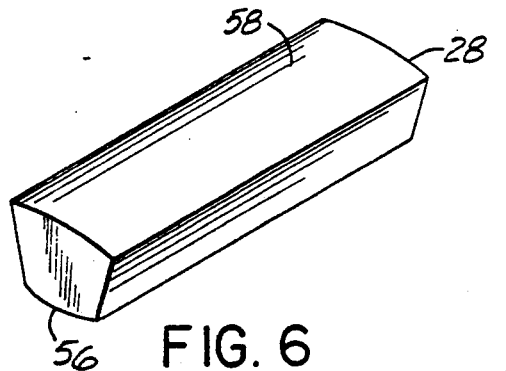
FIG. 6 is a perspective view of a load-bearing plate for use in the present invention.
Figure 7:
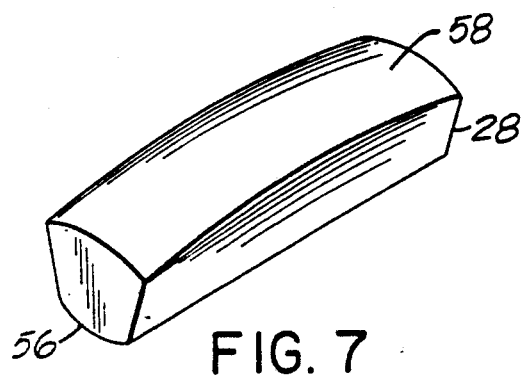
FIG. 7 is a perspective view of a crowned load-bearing plate for use in the present invention.
Figure 8:
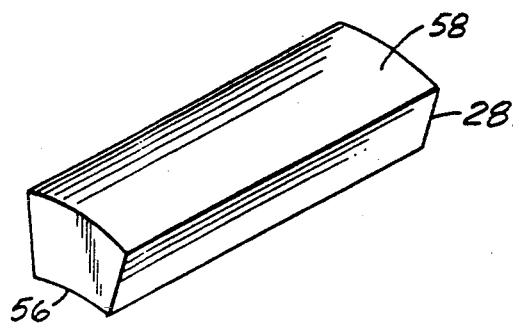
FIG. 8 is a perspective view of a load bearing plate having a concave load bearing surface.
Figure 9:
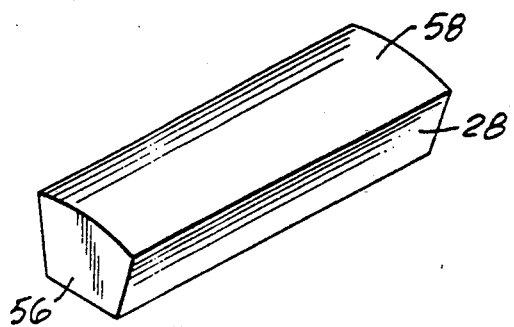
FIG. 9 is a perspective view of a load bearing plate having a flat load bearing surface.

In the load bearing plates of FIGS. 6, 8 and 9 the outer radial surface 58 is formed substantially concentric to the shaft 60 on which the bearing assembly 20 is mounted. On the crowned configuration (FIG. 7) the outer radial surface 58 is axially crowned relative to the inner radial surface 56 resulting in a bearing assembly that is easier to self align.

Figure 10:
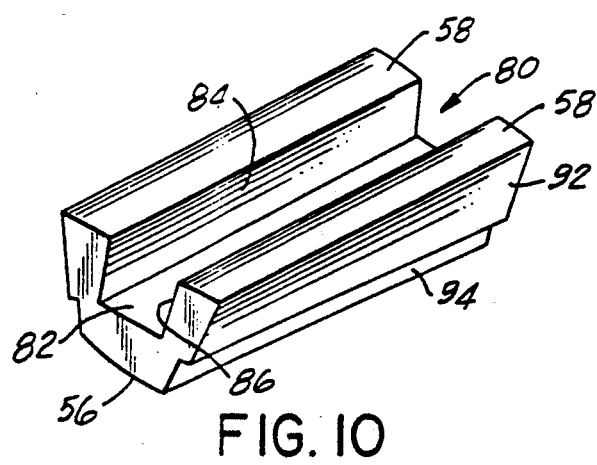
FIG. 10 is a perspective view of a load bearing plate having a side wall portion of the return path formed in an upper portion thereof.
Figure 11:
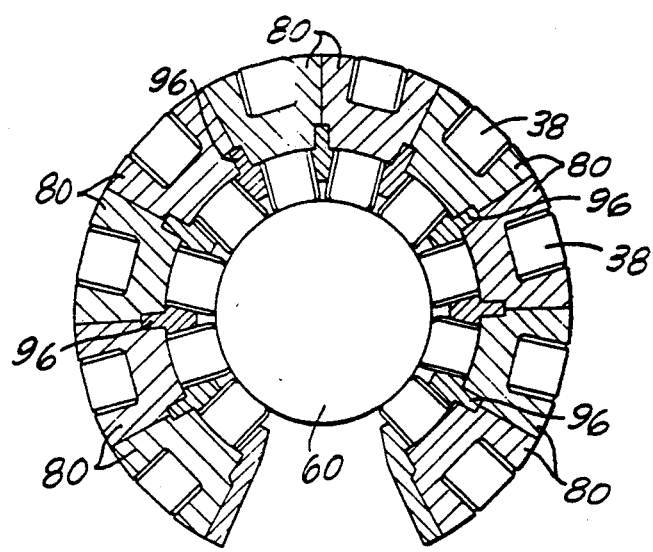
FIG. 11 is a cross-sectional view of a bearing assembly utilizing the bearing plate of FIG. 10.
Figure 12:
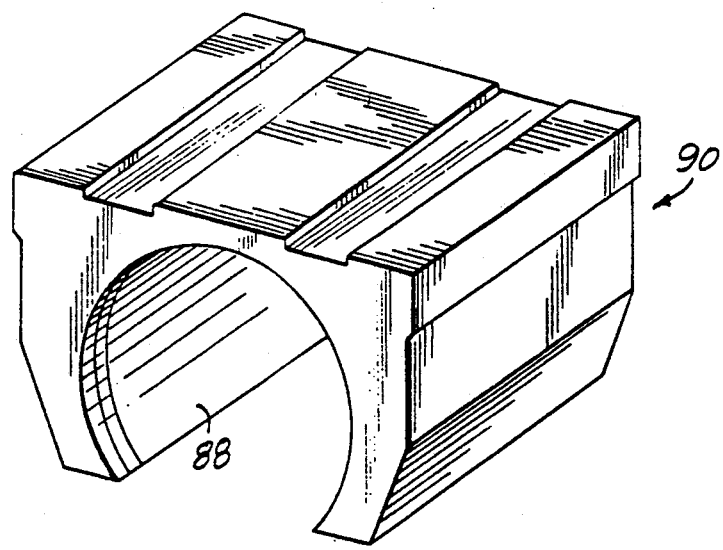
FIG. 12 is a perspective view of a bearing carriage for receiving the bearing assembly of FIG. 11.

Referring to FIGS. 10-12, load bearing plate 80 is formed in an abbreviated V-shaped configuration with the internal portion of the V defining a floor 82 and opposing side walls 84, 86 of return path 34. The inner radial surface 56 forms a portion of the load bearing path 32 and may advantageously be formed in a concave, flat or convex configuration as discussed above with respect to FIGS. 6-9. The outer radial surface 58 is formed substantially concentric to the shaft 60 on which the bearing assembly is mounted and conforms to the shape of the interior portion 88 of bearing carriage 90.

The outer side walls of load bearing plate 80 are divided into an upper portion 92 and a lower portion 94. Upper portion 92 of the outer side walls are angled such that when respective load bearing plates longitudinally abut, a roller bearing assembly for linear motion on a substantially round shaft is formed (FIG. 11). The area defined between lower portions 94 of adjacent abutting load bearing plates is adapted to receive a portion of axial guides 96. As discussed above, these axial guides 96 may be advantageously formed as a single unit which fits into place when the bearing assembly is fabricated and is at least partially held in place by endcaps 22. See FIGS. 2 and 3 above.

It is contemplated that endcaps 22 and axial guides 24, 96 may be formed as a unitary hermaphroditic structure or in separate interlocking units for ease of assembly.

To assemble the bearing 20, an end cap 22 is fitted to carriage block 62. In the embodiment of FIGS. 1 and 4 circumferential projection 68 formed around the outer periphery of end cap 22 fits into groove 70 formed around the inner periphery of carriage block 62. It would be readily appreciated by one skilled in the art that other acceptable attaching means would be interchangeable including screws, welding, etc.

Load bearing plates 28 are positioned into receiving means, i.e. shelf structure 54 formed in adjacent upper portions 52 of axial roller guides 24 comprising the integral axial roller guide element 26. The integral axial roller guide element is flexed to conform to the shape of the interior of the carriage block 62. Additional positioning support is provided by annular groove 72 formed on the inner surface of end caps 22 and dimensioned and configured to receive rib structure 46 of the integral axial roller guide element therein. Where integral inner guides 44 are formed into the integral axial roller guide element 26, these inner guides align with and form a portion of the turnaround 40.

After the integral axial guide element 26 with load bearing plates 28 loaded therein is in place, a second end cap 22 is brought into position adjacent the carriage block 26 and the incomplete bearing assembly is positioned on shaft 60. Rollers 38 are then loaded onto both the load bearing and return paths, 32, 43, and the second end cap 22 is snapped into place on the carriage block 62. The assembled bearing 20 is then ready for testing and operation.

Where a bearing plate 80 in accordance with FIG. 10 is used, a plurality of bearing plates are concentrically abutted as shown in FIG. 11. Axial inner guides 96 are inserted and rollers 38 are loaded into load bearing paths 32 and return paths 34 after the bearing assembly has been positioned on shaft 60. Where desired, the bearing assembly may be inserted into an appropriate bearing carriage 90 (FIG. 12).

The above described bearing assemblies are shown as linear motion open type roller bearings for purposes of illustration only. One skilled in the art will readily appreciate that a variety of other types of roller bearings can be fabricated including closed-type bearings. To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

We claim:

1. A linear motion roller bearing assembly for movement along a shaft comprising:
   a pair of opposing end caps with a plurality of roller turnarounds formed therein;
   a plurality of radially disposed axial roller tracks with rollers therein, said tracks having both load-bearing paths and return paths radially arranged around said shaft in communication with said roller turnarounds; and
   a plurality of axial roller guides monolithically formed as a single element having substantially nonload-bearing receiving means formed therein for receiving a plurality of load-bearing plates, said load-bearing plates having a radial inner surface forming a top surface of said load-bearing paths and a radial outer surface forming at least a floor surface of said return paths.

2. A linear motion roller bearing assembly as in claim 1 further comprising a plurality of inner guides monolithically formed with said integral axial roller guide element.

3. A linear motion roller bearing assembly as in claim 1 further comprising a carriage block for receiving said assembly therein.

4. A linear motion roller bearing assembly as in claim 3 wherein at least a portion of said return paths are formed in said carriage block.

5. A linear motion roller bearing assembly as in claim 1 wherein said monolithically formed axial roller guide element is formed of a flexible polymer.

6. A linear motion roller bearing assembly as in claim 1 wherein said radial outer surface of said load-bearing plates is crowned.

7. A linear motion roller bearing assembly as in claim 1 wherein said rollers are cylindrical and said inner radial surfaces of said load-bearing plates are convex.

8. A linear motion roller bearing assembly as in claim 1 wherein said rollers are convex and said inner radial surfaces of said load-bearing plates are flat.

9. A linear motion roller bearing assembly as in claim 1 wherein said rollers are concave and said inner radial surfaces of said load-bearing plates are convex.

10. A linear motion roller bearing assembly as in claim 1 wherein said rollers are convex and said inner radial surfaces of said load-bearing plates are concave.

11. A linear motion roller bearing assembly as in claim 1 wherein said receiving means comprises shelf structure formed in an outward radial portion of said axial roller guides for receiving said load-bearing plates.

12. A linear motion roller bearing assembly for movement along a shaft comprising:
a pair of opposing end caps having a plurality of roller turnarounds formed therein;
a plurality of radially disposed axial roller tracks with rollers therein, said tracks having both load bearing paths and return paths radially arranged around said shaft in communication with said ball turnarounds;
a plurality of load-bearing plates adapted for abutting radial alignment around said shaft, said load-bearing plates each having a radial inner surface forming a complete top surface of said load-bearing paths and a radial outer surface forming at least a complete floor surface of said return paths; and
a plurality of individual axial roller guides inserted between said load-bearing plates to form at least a portion of opposing side walls of said load-bearing paths.

13. A linear motion roller bearing assembly as in claim 12 wherein said load-bearing plates further include structure forming a portion of opposing side walls of said return paths.

14. A linear motion roller bearing assembly as in claim 12 wherein said plurality of individual axial roller guides are monolithically formed as a single element.

15. A linear motion roller bearing assembly as in claim 14 further comprising a plurality of inner guides monolithically formed with said axial roller guides.

16. A linear motion roller bearing assembly as in claim 12 wherein said rollers are cylindrical and said inner radial surfaces of said load-bearing plates are convex.

17. A linear motion bearing assembly as in claim 12 wherein said rollers are convex and said inner radial surfaces of said load-bearing plates are flat.

18. A linear motion roller bearing assembly as n claim 12 wherein said rollers are convex and said inner radial surfaces of said load-bearing plates are concave.

19. A linear motion roller bearing assembly as in claim 12 wherein said rollers are concave and said inner radial surfaces of said load-bearing plates are convex.

20. A linear motion bearing assembly as in claim 12 further comprising a plurality of inner guides forming an inner radial surface of said roller turnarounds.

21. A linear motion roller bearing assembly as in claim 12 further comprising a carriage block.

22. A linear motion roller bearing assembly for movement along a shaft comprising:
a carriage block having a plurality of axially disposed lands and grooves formed on an inner surface thereof, said grooves forming a portion of a plurality of radially disposed roller tracks having rollers disposed therein;
a pair of end caps positioned on opposing ends of said carriage block in communication with said plurality of roller tracks, said end caps further including a plurality of turnarounds formed therein for guiding said rollers from a load-bearing path to a return path of said roller tracks; and
a plurality of axial roller guides formed as an integral element, said roller guides having shelf structure formed in an outward radial portion of said axial roller guides for receiving a plurality of load bearing plates therein.

23. A linear motion roller bearing assembly as in claim 22 further comprising a plurality of inner guides integrally formed with said integral axial roller guide element.

* * * * *